US012611923B2

(12) United States Patent
Oechslen et al.

(10) Patent No.: US 12,611,923 B2
(45) Date of Patent: Apr. 28, 2026

(54) COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Gemmingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 464 days.

(21) Appl. No.: 18/450,430

(22) Filed: Aug. 16, 2023

(65) Prior Publication Data

US 2024/0059139 A1 Feb. 22, 2024

(30) Foreign Application Priority Data

Aug. 22, 2022 (DE) ..................... 10 2022 121 130.4

(51) Int. Cl.
| | |
|---|---|
| *B60K 11/02* | (2006.01) |
| *B60R 16/08* | (2006.01) |
| *H02K 9/19* | (2006.01) |
| *H02K 9/193* | (2006.01) |

(52) U.S. Cl.
CPC .............. *B60K 11/02* (2013.01); *B60R 16/08* (2013.01); *H02K 9/193* (2013.01)

(58) Field of Classification Search
CPC .............. B60K 11/02; B60K 2001/003; B60K 2001/006; B60R 16/08; B60R 16/02; B60R 16/04; H02K 9/193; H02K 9/19
See application file for complete search history.

(56) References Cited

U.S. PATENT DOCUMENTS

| | | | |
|---|---|---|---|
| 11,873,752 B2* | 1/2024 | Trümper | F01P 11/029 |
| 12,409,721 B2* | 9/2025 | Oechslen | B60K 11/04 |

FOREIGN PATENT DOCUMENTS

| | | | |
|---|---|---|---|
| DE | 102006047518 B4* | 2/2016 | F01P 3/20 |
| DE | 102019215797 A1* | 5/2020 | F01P 7/16 |
| DE | 102020114596 A1* | 12/2021 | H02K 11/20 |

* cited by examiner

*Primary Examiner* — John D Walters
(74) *Attorney, Agent, or Firm* — LEYDIG, VOIT & MAYER, LTD.

(57) ABSTRACT

A cooling system for an electric traction machine for a motor vehicle includes a circuit system for conducting a first coolant to be circulated, a circulation pump for conveying the first coolant in the circuit system in a first circulation direction, and an expansion tank filled at least partially with the first coolant and at least partially with a gas. The cooling system also includes a motor input terminal for fluidically connecting the circuit system on an input side to the electric traction machine, a motor output terminal for fluidically connecting the circuit system on an output side to the electric traction machine, and a first heat exchanger for dissipating heat from and/or supplying heat to the first coolant. The expansion tank is exclusively connected on a gas side to at least one volume equalization tank which is closed gas-tight to an environment.

19 Claims, 2 Drawing Sheets

COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 121 130.4, filed on Aug. 22, 2022, which is hereby incorporated by reference herein.

FIELD

The invention relates to a cooling system for an electric traction machine for a motor vehicle, a thermal management module having such a cooling system for a powertrain of a motor vehicle, a powertrain having such a thermal management module for a motor vehicle, and a motor vehicle having such a powertrain.

BACKGROUND

From the prior art, cooling systems for electric traction machines are known for dissipating the resulting waste heat in case of a power demand. For increased cooling capacity, the idea is to directly perfuse at least the stator of an electric traction machine with a coolant, wherein the coolant is to be configured as a dielectric coolant. It is sensible to cool as few components as possible in this dielectric cooling system. Other components of a powertrain in which such an electric traction machine is integrated, such as a transmission and a pulse inverter, are preferably cooled in at least one separate cooling circuit. For example, a transmission is cooled by means of an oil circuit such that the coolant (oil) is simultaneously configured so as to lubricate the transmission components. For example, a pulse inverter is arranged in a water circuit, with which further vehicle components are preferably coolable.

Due to unavoidable temperature fluctuations in the coolant, volume changes in the coolant and in a closed system thus lead to the occurrence of pressure fluctuations, which sometimes lead to impermissibly high or low operating pressures. An expansion tank is provided for this purpose, in which the coolant can carry out a volume equalization compared to a (slightly compressible) gas to equalize the pressure. Sometimes this volume adjustment is not sufficient, and a system that is open to ambient air results.

SUMMARY

In an embodiment, the present disclosure provides a cooling system for an electric traction machine for a motor vehicle comprising a circuit system for conducting a first coolant to be circulated, a circulation pump for conveying the first coolant in the circuit system in a first circulation direction, and an expansion tank filled at least partially with the first coolant to be circulated in the circuit system and at least partially with a gas. The cooling system also comprises a motor input terminal for fluidically connecting the circuit system on an input side to the electric traction machine to be temperature-controlled, a motor output terminal for fluidically connecting the circuit system on an output side to the electric traction machine to be temperature-controlled, and a first heat exchanger for dissipating heat from and/or supplying heat to the first coolant to be recirculated in the circuit system. The expansion tank is exclusively connected on a gas side to at least one volume equalization tank which is closed gas-tight to an environment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
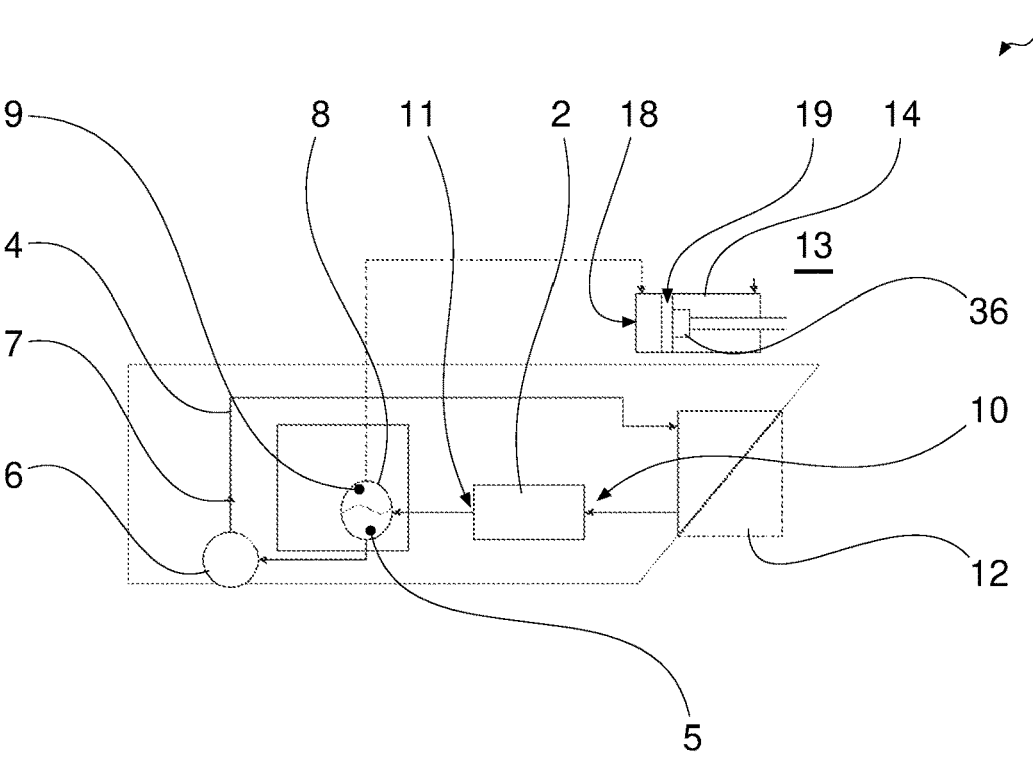
FIG. 1 illustrates a cooling system in a schematic circuit diagram.

In an embodiment, the present invention at least partially overcomes the disadvantages known from the prior art. The features of the present disclosure can be combined in any technically meaningful manner, wherein the explanations from the following description as well as features from the figures, which comprise supplementary configurations of embodiments of the invention, can also be used for this purpose.

In an embodiment, the invention relates to a cooling system for an electric traction machine for a motor vehicle, comprising at least the following components:

a circuit system for conducting a first coolant to be circulated;

a circulation pump for conveying the first coolant in the circuit system in a first circulation direction;

a expansion tank filled at least partially with the first coolant to be circulated in the circuit system and at least partially with a gas;

a motor input terminal for fluidically connecting the circuit system on the input side to an electric traction machine to be temperature-controlled;

a motor output terminal for fluidically connecting the circuit system on the output side to the electric traction machine to be temperature-controlled; and a first heat exchanger for dissipating heat from and/or supplying heat to the first coolant that is being circulated in the circuit system.

The cooling system is characterized in particular in that the expansion tank is exclusively connected to at least one gas-tight volume equalization tank that is closed to the environment on the gas side.

Ordinal numbers used in the description above and below are used only for clear differentiation and do not reflect any order or ranking of the designated components, unless explicitly indicated otherwise. An ordinal number greater than one does not necessitate that a further such component must necessarily be present.

There is the problem that impermissibly high pressure levels or excessively low pressure levels can occur in the cooling system or circuit system as a result of temperature fluctuations and resulting volume variations. A volume equalization as described above by means of a expansion tank is therefore advantageous. It is advantageous here to design the system to be open to the environment for a particularly high volume fluctuation. However, dirt and water may then enter the (first) coolant from the outside. With the cooling system disclosed herein, this is preventable.

In advance, it should be noted that, with the cooling system disclosed here, waste heat must primarily be dissipated, but an increase in the temperature of components temperature-controlled by the cooling system is also a possible operating condition, for example in winter temperatures, so that the components are brought quickly to operating temperature. In most applications, however, waste heat is also to be dissipated in winter temperatures in the operation of an electric traction machine of a motor vehicle, i.e. cooling is the goal.

It should further be noted that, for clarity in terms of components and properties to be described later, components and properties of the cooling system having the same name are respectively designated as "first" components or properties, wherein this is not always done in a clear context.

The cooling system comprises a circuit system comprising a plurality of conduits and/or conduit portions between the components of the cooling system. Within the circuit system, the first coolant is encapsulated against an environment and thus a loss of gaseous contents can at most occur therein to a negligible degree (for example, as a result of leakages). A (first) circulation pump is provided for circulating the first coolant. A pressure gradient is generated by the circulation pump, resulting in a (first) circulation direction in the circuit system. In an embodiment, the circulation pump is reversibly operable, but the first circulation direction is the main direction of operation, at least when dissipating waste heat from the integrated electric traction machine. A reversal of the direction is adjustable, for example, by reversing the direction of rotation of a pump wheel, but preferably by way of a corresponding way valve.

The expansion tank is configured so as to equalize the volume between the circuit system with a first coolant and an (at least slightly compressible) gas, for example air, in order to avoid exceeding a predetermined pressure limit depending on temperature changes within the circuit system. For some applications, it is sufficient to form the expansion tank to be closed in an embodiment, wherein a gas in the expansion tank is compressed and the resulting pressure increase within an operational state according to the design does not exceed a predetermined pressure limit in the circuit system. Alternatively, or by means of a switching valve depending on the situation, the expansion tank is designed to be open, wherein a gas is drained from the expansion tank during a volume increase and drawn in during a volume decrease. In an embodiment, a semi-open expansion tank is provided, in which a gas is removed and supplied according to the type of open expansion tank; wherein, however, this does not occur from an open environment, but rather from (at least) a connected volume equalization tank, preferably with a variable volume, for example using a bellows or similar. It should be noted that in the embodiment disclosed herein, the gas in the expansion tank is only transferable to or from the volume equalization tank, and is closed to the surrounding environment. This protects the system from an entry of humidity and dirt. Furthermore, leakage of volatile coolant as a result of unavoidable conduction leakage is reliably prevented or reduced to a negligible amount.

Optionally, a further task of the expansion tank is that gas inclusions in the first coolant are separable as a result of a pressure gradient that is present towards the gas, and are then discharged into the environment or supplied to an enclosed gas (e.g. in the volume equalization tank).

An electric traction machine is integrated into the cooling system for temperature control by supplying the first cooling fluid via a motor input terminal and again dissipating the introduced first cooling fluid from the electric traction machine via a motor output terminal. It should be noted that when the (first) circulation direction is reversed, an output is formed from the motor input terminal and an input is formed from the motor output terminal. Preferably, however, the direction of flow via the electric traction machine remains the same, i.e. the motor input connection is an input and the motor output connection is an output for the first coolant, wherein this is achieved, for example, by means of appropriate conduit routing and/or at least one switchable way valve.

The (first) heat exchanger is formed so as to transfer heat between two fluids, i.e. the first coolant and a further fluid (for example water or ambient air). In an embodiment for air cooling, for example, a fan is included.

In an advantageous embodiment, the conduit distance between the electric traction machine and the heat exchanger in the circuit system is as short as possible. Alternatively or additionally, for the same reason, a conduit portion between the heat exchanger and the electric traction machine in the circuit system is thermally isolated and/or spaced as far apart as possible from other heat sources.

It is furthermore disclosed in an advantageous embodiment of the cooling system that at least one of the volume equalization tanks is formed as:

a portion of a thermal management module; and/or a part of a chassis of an automobile, preferably integrated into a beam of the chassis.

It is disclosed herein that the volume equalization tank is part of a thermal management module. For example, such a thermal management module consists of a component unit or a modular system that is assembled in a production line, preferably in a separate work step or work process. The volume equalization tank is then already part of this component unit or this modular system. It should be noted that in an advantageous embodiment, the volume equalization tank is arranged close to the expansion tank. Alternatively or additionally, the volume equalization tank is arranged further away, for example in a construction gap with a drive unit and/or with a traction battery and/or in the driver's cab (for example, under a seat).

Alternatively, it is disclosed herein that the volume equalization tank is part of a chassis of a motor vehicle. For example, in another manufacturing step; for example, in a pre-assembly, preferably at a supplier, such a volume equalization tank is manufactured or mounted. This volume equalization tank is then fluidically connected (on the gas side) to the expansion tank via a connector on the production line. In an advantageous embodiment, the mounting location for this volume equalization tank is an existing cavity in the chassis, or one that is obtainable with few drawbacks.

In a preferred embodiment, such a volume equalization tank is integrated into a beam of the chassis as part of a chassis. For example, one of the pillars, for example the B-pillar, is arranged with a corresponding cavity, from which the volume equalization tank is formed or into which it is received.

It is furthermore disclosed in an advantageous embodiment of the cooling system that at least one of the volume equalization tanks is formed as a tank:

having at least one resilient wall to the surrounding environment; and/or having at least one rigid movable wall.

Herein, it is disclosed that the volume equalization tank comprises at least one elastic wall, wherein a desired minimum pressure is preferably not only set above the externally adjacent (for example atmospheric) pressure, but also above the elasticity of the elastic wall. In an embodiment, for example, the volume equalization tank is formed in the manner of a balloon; in another, for example, it is formed as a rigid box with one or more elastic walls.

Alternatively or additionally, it is herein disclosed that the volume equalization tank is arranged with at least one rigid movable wall. In a simple embodiment, the volume equalization tank consists of a cylinder having a reciprocating piston. In another embodiment, at least one elastic wall is additionally provided. Preferably, a desired minimum pressure is not only via the pressure applied from the outside on the reciprocating piston (for example, atmospheric pressure), but also via a preload, for example by means of an energy storage element, for example a compression spring.

It is furthermore disclosed, in an advantageous embodiment of the cooling system, that the at least one volume equalization tank is loaded by atmospheric pressure from the outside.

In this embodiment, it is disclosed that the volume equalization tank, preferably exclusively by means of ambient pressure, is preloaded for a desired minimum pressure. In an embodiment, effects of preloading due to elasticity (for example, an elastic wall) and/or friction (for example, a movable wall) are negligible compared to atmospheric pressure.

It is furthermore disclosed, in an advantageous embodiment of the cooling system, that the volume equalization tank comprises at least the following components:

at least one inlet for a first coolant;
a first outlet for the first coolant;
a second outlet for a gas; and
a connecting channel between the at least one inlet and the outlet, wherein one of the inlets for the first coolant and the second outlet for a gas are always arranged above the first outlet for the first coolant in the installation situation in any operating state.

Here, an expansion tank is proposed in which, in the corresponding installation situation, it is ensured in every operating state that the inlet for the coolant is always arranged above the first outlet for the coolant. In an application in a motor vehicle, such an expansion tank is subject to strong accelerations, primarily in the transverse direction and in the longitudinal direction of the motor vehicle, i.e. in the directions transverse to the gravitational field of the earth.

The expansion tank comprises an inlet for the coolant, which enters the expansion tank, for example in a cooling system, after a circulation. In an embodiment, the inlet of an electric traction machine is arranged immediately downstream. Furthermore, a first outlet is provided, via which the coolant is further circulated in the cooling system or the circuit system. For example, the first outlet is arranged immediately upstream of a circulation pump. Via the first outlet, the coolant enters the circuit system, separated as far as possible from gas inclusions, for further conveyance. Furthermore, a second outlet via which gas can escape is provided, and which is separated from the coolant or displaced due to a volume increase of the coolant (for example, for temperature-related reasons). It should be noted that, in a preferred embodiment, the second outlet is also an inlet for a gas, provided that the volume of the coolant decreases and gas is drawn in from the outside in order to avoid the occurrence of an excessive underpressure. However, it should also be noted that the outlet for gas does not necessarily face an open environment, but is also connected to at least one further volume equalization tank in an embodiment, and an excessive pressure increase or pressure drop in the coolant or circuit system is prevented in this case by means of good compressibility and a corresponding volume of the gas.

A connecting channel is provided between the inlet and the outlet to conduct the coolant. Here, an offset channel is provided, which runs horizontally in the installation situation, wherein the offset preferably has approximately the same horizontal distance to the extremum of the horizontal extent of the connecting channel as the vertical distance. This ensures that the highest point is always formed by this inlet for the coolant, even if there is an overall acceleration that deviates from the geometry due to a superimposition of acceleration due to gravity by the vehicle acceleration. Therefore a degassing portion within the expansion tank is maximized, and the expansion tank is thereby particularly efficient for avoiding gas inclusions in the coolant.

In the direction of flow between the at least one inlet and the first outlet, the expansion tank comprises a filter medium for removing particles and/or water from the coolant. This arrangement ensures that no water or only a small amount of water is fed into the cooling system via the first outlet, on the one hand. On the other hand, there is no need for a collection container for a pure separator because the water is permanently retainable here. In an advantageous embodiment, the filter media is arranged at a low, preferably lowest, point of the connection channel so that the denser water rests here and is subjected to a low flow rate or shear flow, and thus the water already deposited is not mingled, or is only mingled in a negligible amount.

In an advantageous embodiment, a second inlet for the coolant is provided, wherein this is preferably located below the fluid level when the expansion tank is operated in a cooling system. For example, the second inlet is arranged at about the same height as the first outlet for the coolant. In a preferred embodiment, the coolant is then fed to the expansion tank via both the first inlet (as described above) and the second inlet, so that the degassing distance for the coolant entering the expansion tank via the second inlet is significantly shortened, however this reliably prevents the circulation pump from attracting gaseous components in larger quantities in an operating state (so-called air-drawing is avoided).

According to a further aspect, a thermal management module for a powertrain of a motor vehicle is disclosed, comprising at least the following components:

for a transmission, an oil circuit having a second circulation direction and having a second heat exchanger;
for at least one vehicle component, a water circuit having a third circulation direction and having a third heat exchanger; and
for an electric traction machine, a cooling system according to one embodiment according to the above description, wherein, preferably, a pulse inverter for the electric traction machine is arranged in the water circuit.

Here, the cooling system described above is integrated into a thermal management module for a powertrain of a motor vehicle, wherein this thermal management module [TMM] is well known for its functions and tasks. In addition to components of a powertrain, other vehicle components are preferably also temperature-controlled, for example a (preferably traction) battery.

Other components of a powertrain in which such an electric traction machine is integrated, such as a transmission and a pulse inverter, are preferably cooled in at least one cooling circuit that is separate from the cooling system. For example, a transmission comprising a (preferably switchable) gear box and/or a differential is cooled by way of an oil circuit with an oil, preferably directly. Direct cooling is a flow that directly contacts component of the transmission (for example gears), for example as a substitute for a lubricant. For example, the oil circuit is conventional. In an advantageous embodiment, a second circulation pump for generating a second circulation direction in the oil circuit is coupled to the first circulation pump for generating the first circulation direction in the circuit system for the first coolant as a so-called tandem pump, such that a single drive is sufficient for both circulation pumps. The waste heat is thereby released via the second heat exchanger.

Vehicle components to be temperature-controlled, which are not arranged in the oil circuit or the cooling system, are preferably temperature-controlled by means of a water circuit. The water is often a water-glycol mixture. The water of the water circuit is conveyed (by means of a third circulation pump) in a third circulation direction via a third heat exchanger. The third heat exchanger is preferably configured for heat transfer with the environment or the ambient air, wherein a fan is preferably provided for a (forced) convection on the third heat exchanger.

It should be noted that the respective components are also heatable in the oil circuit and/or the water circuit, for example in winter temperatures, wherein, however, the main state here is also the dissipation of waste heat. The respective circulation direction is also reversible, where appropriate.

In an advantageous embodiment, a pulse inverter [PWR] for an electric traction machine to be temperature-controlled by the cooling system with the coolant is arranged in the water circuit for temperature control, i.e. there is no component to be temperature-controlled in the cooling system with the coolant. It is advantageous to keep the number of components in said cooling system for an electric traction machine low. With a pulse inverter, the use of a (dielectric) coolant is not necessary. It is therefore advantageous to arrange the pulse inverter outside of said cooling system.

It is further disclosed, in an advantageous embodiment of the thermal management module, that the water circuit be connected to the first heat exchanger of the cooling system for an electric traction machine for heat transfer, preferably as the only liquid-bonded heat transfer of the cooling system to the environment, wherein, preferably in the third circulation direction of the water circuit, a pulse inverter for an electric traction machine is arranged upstream of the first heat exchanger.

It is disclosed here that the cooling system should be heat-coupled to the coolant and the water circuit, i.e. the water circuit is set up by means of the (first) heat exchanger for temperature control of the coolant. Therefore, in the first heat exchanger, for example when cooling of the electric traction machine (technically without fluid exchange), the heat is released from the coolant to the water in the water circuit.

In a preferred embodiment, no further (forced) convection is provided for temperature control of the electric traction machine (and preferably also not for further components in the cooling system) and for dissipating heat from the coolant. Rather, the first heat exchanger is then the only unit of the cooling system for transferring heat, namely with the water circuit.

In a preferred embodiment, the pulse inverter is arranged in the (third) circulation direction of the water circuit upstream of the first heat exchanger so that the temperature gradient above the pulse inverter is as large as possible, while the temperature gradient above the first heat exchanger (due to the mostly very large heat output of the electric traction machine) is still sufficient.

In an advantageous embodiment, a reversing valve is provided for reversing the (first) circulation direction. In an embodiment, the coolant then passes through a separate return channel. Preferably, the same conduit is used for both directions.

Thus, in the main direction, the order of the components is (beginning with the first circulation pump):
1. the first circulation pump;
2. the first heat exchanger;
3. the electric traction machine; and
4. the expansion tank.

And, in the minor direction, the order of the components is:
1'. the first circulation pump;
2'. the expansion tank;
3. the first heat exchanger; and
4'. the electric traction machine.

It should be noted that possible further components in the cooling system are also supplied in reverse, or only a few or exclusively the aforementioned three components are supplied in reverse order.

It is further disclosed, in an advantageous embodiment of the thermal management module, that the water circuit also be connected to the second heat exchanger of the oil circuit for heat transfer, preferably as the only liquid-bonded heat transfer of the cooling system to the environment, wherein, preferably in the third circulation direction of the water circuit, the first heat exchanger is arranged upstream of the second heat exchanger.

It is disclosed here that the oil circuit and the water circuit be heat-coupled to one another, i.e. the water circuit is configured by means of the (second) heat exchanger for temperature control of the oil. In the second heat exchanger, for example, when the transmission cools (technically without liquid exchange), the heat from the oil in the oil circulation is released to the water in the water circuit.

In a preferred embodiment, no further (forced) convection is provided for temperature control of the transmission (and preferably also not for further components in the oil circuit) and for dissipating heat from the oil. Rather, the second heat exchanger is then the only unit of the oil circuit for heat transfer, namely with the water circuit.

In a preferred embodiment, the first heat exchanger is arranged in the (third) circulation direction of the water circuit upstream of the second heat exchanger so that the temperature gradient above the first heat exchanger is as large as possible, while the temperature gradient above the second heat exchanger (due to the mostly higher permissible temperature level in a transmission in comparison to an electric traction machine) is still sufficient.

According to a further aspect, a powertrain for a motor vehicle is disclosed, comprising at least the following components:
  at least one electric traction machine for providing a torque;
  at least one propulsion wheel for propelling the relevant motor vehicle by means of a torque of the electric traction machine;

at least one transmission for conducting a torque between the electric traction machine and at least one of the propulsion wheels; and a cooling system according to one embodiment according to the above description for at least one of the electric traction machines and/or a thermal management module according to one embodiment according to the above description for at least one of the electric traction machines, at least one of the transmissions and at least one vehicle component, and preferably a pulse inverter for at least one of the electric traction machines.

A powertrain is now disclosed here, which comprises at least one electric traction machine by means of which torque is generated. The torque of the respective electric traction machine is transferable via a transmission to at least one propulsion wheel. The at least one propulsion wheel is configured so as to drive the motor vehicle forward. The temperature control of the components of the powertrain is performed by a cooling system or a thermal management module comprising a cooling system according to one embodiment according to the above description. For the third heat exchanger, the air of the environment is preferably used, namely passively by means of driving wind and/or actively by means of a fan.

In a further aspect, a motor vehicle is disclosed, comprising a chassis having a transport compartment and a powertrain according to an embodiment according to the description above for driving the automotive vehicle forward.

The motor vehicle is provided for transporting at least one passenger and/or goods and comprises a passenger compartment and/or a cargo compartment. The motor vehicle is driven via the at least one propulsion wheel by means of the torque of at least one of the electric traction machines.

Embodiments of the invention are explained in detail below with reference to the accompanying drawings, which show preferred configurations, in light of the relevant technical background. The invention is not limited in any way by the purely schematic drawings, wherein it is noted that the drawings are not true to size In FIG. 1, the cooling system 1 comprises a circuit system 4, comprising a plurality of conduits and/or conduit portions between the components of the cooling system 1. Within the circuit system 4, the first coolant 5 is encapsulated against an environment 13, so that a loss of gaseous contents occurs at most in negligible amounts here (for example as a result of leakages). A (first) circulation pump 6 is provided for circulating the first coolant 5. A pressure gradient is generated by the circulation pump 6, resulting in a (first) circulation direction 7 in the circuit system 4. An expansion tank 8 is configured so as to equalize the volume between the circuit system 4 with a first coolant 5 and an (at least slightly compressible) gas 9, for example air, in order to avoid exceeding a predetermined pressure limit depending on changes in temperature in the circuit system 4.

An electric traction machine 2 is integrated into the cooling system 1 for temperature control by supplying the first coolant 5 via a motor input connection 10 and dissipating the introduced first coolant 5 from the electric traction machine 2 again via a motor output connection 11. The first coolant 5 heated (or if necessary cooled) in the electric traction machine 2 is temperature-controlled by means of a first heat exchanger 12, which is formed to transfer heat between two fluids, i.e. the first coolant 5 and a further fluid (for example water or ambient air). In an embodiment for air cooling, for example, a fan is included.

The expansion tank 8 is arranged between the electric traction machine 2 and the first recirculation pump 6. In this embodiment example, a semi-open expansion tank 8 is provided, in which a gas 9 is discharged and supplied according to the manner of an open expansion tank 8, wherein, however, this does not occur from an open environment 13, but rather from (at least) a connected volume equalization tank 14, preferably with a variable volume. It should be noted that in the embodiment example disclosed here, the gas 9 in the expansion tank 8 can only be transferred into or out of the volume equalization tank 14 and is closed to the surrounding environment 13. This protects the system from an entry of humidity and dirt. In addition, an egress of volatile coolant 5 as a result of unavoidable conduction leakages is reliably prevented or reduced to a negligible amount.

Optionally, a further task of the expansion tank 8 is that gas inclusions in the first coolant 5 are separable as a result of a pressure gradient to the gas 9, which are discharged to the environment 13 or supplied to an enclosed gas 9 (for example, into the volume equalization tank 14). It should be noted that in an advantageous embodiment, the volume equalization tank 14 is arranged close to the expansion tank 8. Alternatively or additionally, the volume equalization tank 14 is arranged further away, for example in a construction gap in a drive unit and/or with a traction battery and/or in the driver's cab (for example, under a seat).

The volume equalization tank 14 comprises at least one elastic wall 18, wherein a desired minimum pressure is preferably not only set above the externally adjacent (for example, atmospheric) pressure, but also above the elasticity of the elastic wall 18. In this embodiment example, the volume equalization tank 14 also comprises a rigid movable wall 19, arranged as per the illustration as a reciprocating piston 36, which is movable within the expansion tank 8 or the cooling system 1 by means of atmospheric pressure and volume change energy.

Figure 2:
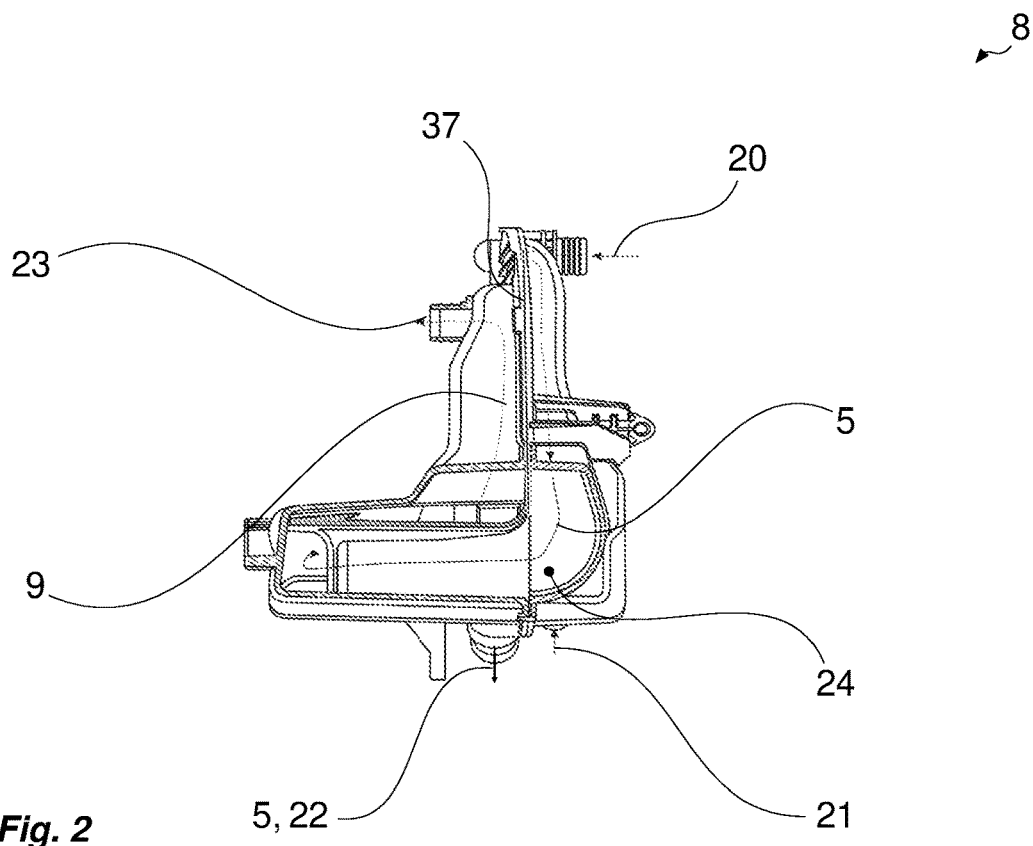
FIG. 2 illustrates an expansion tank in an exploded view.

In FIG. 2, the expansion tank 8 is shown in an exploded view, wherein the expansion tank 8 can be set, for example, in the cooling system 1 according to FIG. 1. As shown in the illustration, the first inlet 20 is arranged at the right upper end of the expansion tank 8, and is configured so as to introduce the first coolant 5. In this embodiment example, a second inlet 21 is additionally arranged at the lower right end of the expansion tank 8 as shown in the illustration, wherein it is configured for conducting the coolant 5 into it. Due to a centered partition 37, the coolant 5 is prevented from flowing to the left according to the illustration, and thus partially flows through the connecting channel 24. Here, the connecting channel 24 extends into the image plane and widens towards a first outlet 22. The flow of the coolant 5 is indicated by the arrow (where not obscured, by a solid line; and where obscured, by a dashed line).

Furthermore, a second outlet 23 is provided, via which gas 9 can escape, which is separated from the coolant 5 or displaced due to a volume increase of the coolant 5 (for example, for temperature-related reasons). It should be noted that, in a preferred embodiment, the second outlet 23 is also an inlet for a gas 9, provided that the volume of the coolant 5 decreases and gas 9 is drawn in from the outside in order to avoid the occurrence of an excessive underpressure. In this embodiment example, the second outlet 23 is connected to the volume equalization tank 14 according to FIG. 1, so that an excessive pressure increase or pressure drop in the coolant 5 or in the circuit system 4 is prevented by means of good compressibility and a corresponding volume of the gas 9.

Figure 3:
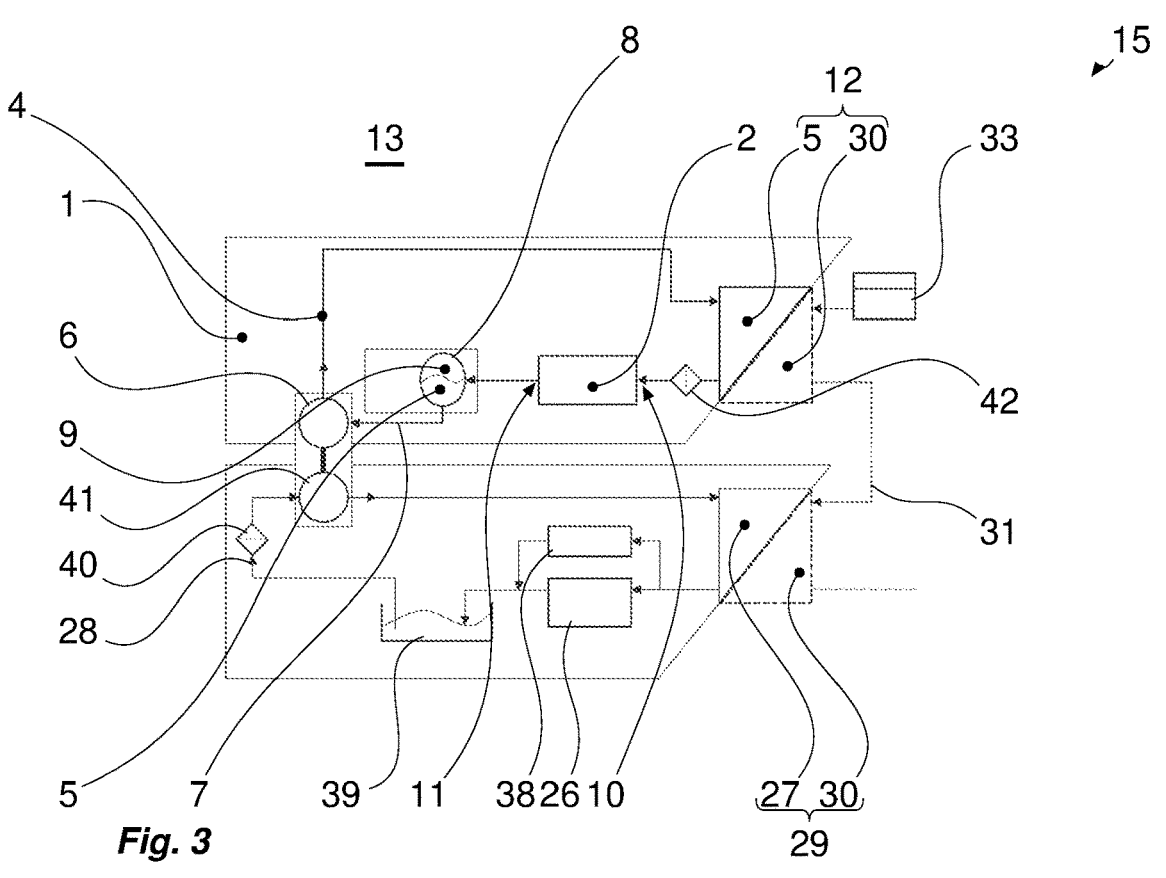
FIG. 3 illustrates a thermal management module in a schematic diagram.

In FIG. 3, a thermal management module 15 is shown in a schematic diagram, which comprises a cooling system 1 according to FIG. 1 (herein shown in a simplified form) for an electric traction machine 2. A first heat exchanger 12 of the cooling system 1 is configured here for heat transfer with a water circuit 30 (shown in a section here), so that the coolant 5 of the circuit system 4 of the cooling system 1 and the water (mixture) of the water circuit 30 are in a heat exchange with each other. A second heat exchanger 29 of an oil circuit 27 for a transmission 26 is also formed for heat transfer with the water circuit 30 here (shown in a section here), so that the oil of the oil circuit 27 and the water (mixture) of the water circuit 30 are in a heat exchange with each other.

In the water circuit 30, a pulse inverter 33 for the electric traction machine 2 to be temperature-controlled in the cooling system 1 is arranged here, namely in the (third) circulation direction 31 of the water circuit 30 upstream of the first heat exchanger 12 of the cooling system 1 with the (first) coolant 5. In addition, the second heat exchanger 29 is arranged behind the first heat exchanger 12 in the third circulation direction 31.

In the oil circuit 27, in the (second) circulation direction 28, a transmission 26 and a transmission component 38 are arranged downstream of the second heat exchanger 29, and are connected here in parallel. Subsequently, an oil sump 39, consequently a coarse filter 40 and finally (shown in the illustration) a second circulation pump 41, are arranged in the oil circuit 27. The second circulation pump 41 is here (optionally) embodied as a tandem pump with a first circulation pump 6 of the cooling system 1 with the first coolant 5.

The cooling system 1 comprises a circuit system 4 in which the following components are arranged in the (first) circulation direction 7:

1. the first circulation pump 6;
2. the first heat exchanger 12;
3. a purely optional oil filter 42;
4. the electric traction machine 2, which is perfused via a motor input connection 10 and a motor output connection 11; and
5. an expansion tank 8.

The expansion tank 8 is filled partially with the first coolant 5 and partially with a gas 9, so that a pressure increase resulting from a temperature-related increase in volume can be compensated or at least reduced by means of the volume equalization tank 14 and the therein contained compressible gas 9. It should be noted that, in the embodiment of the thermal management module 15 shown, no heat exchanger is provided from the cooling system 1 and the oil circuit 27 for heat transfer to the environment 13. Rather, the first heat exchanger 12 and the second heat exchanger 29 are coupled to the water circuit 30.

Figure 4:
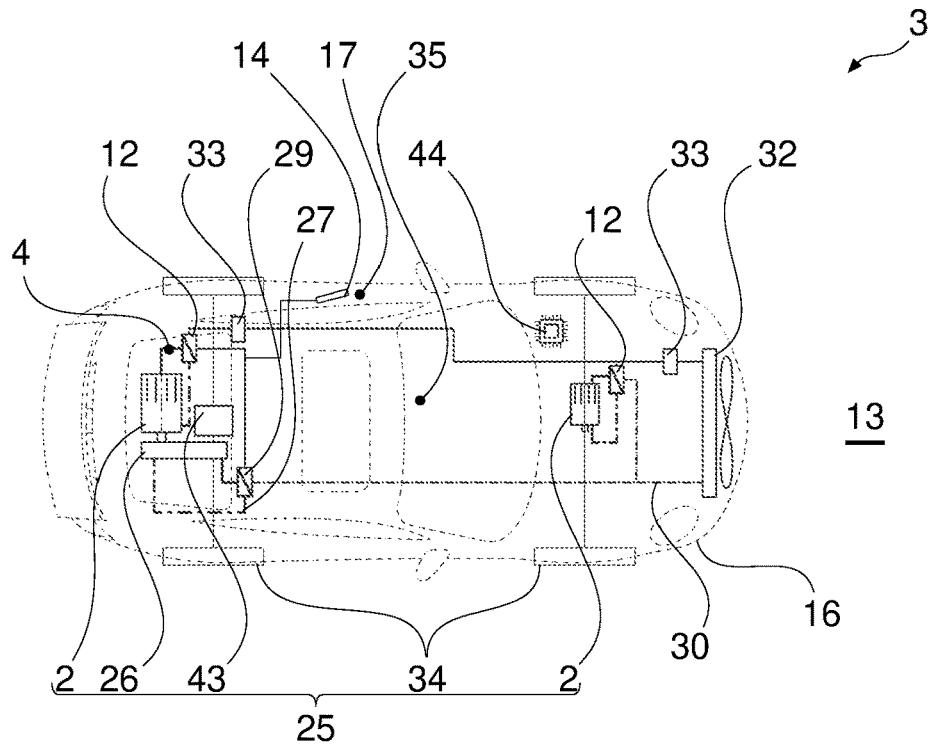
FIG. 4 illustrates a motor vehicle having a thermal management module in a schematic top view.

In FIG. 4, a motor vehicle 3 with a thermal management module 15 is shown in a schematic top plan view with a powertrain 25. The motor vehicle 3 has approximately in the middle of its chassis 16 a beam 17 and/or a sill with a volume equalization tank 14 and a transport compartment 35, for example a passenger compartment, and four propulsion wheels 34 on the side of its chassis 16 for propelling the motor vehicle 3. In front, there is an electric traction machine 2 (optionally purely coaxial here) and in the rear, a further electric traction machine 2 (in this case optionally axially arranged), and in the rear, a transmission 26, comprising a differential 43, wherein the differential 43 is preferably integrated into the oil circuit 27. A pulse inverter 33 is provided for each of the front and rear electric traction machines 2. A water circuit 30 is configured for the temperature control of the pulse inverter 33 and the first heat exchanger 12 as well as the second heat exchanger 29, wherein the heat of the water circuit 30 can be dissipated to the environment 13 via a third heat exchanger 32 (shown here with a fan). The leading conduit is shown here with a solid line and the return line respectively as a dotted line so that the (third) circulation direction 31 of the water circuit 30 runs counterclockwise in the illustration. Likewise, this is shown in the cooling system 1 on the electric traction machines 2 and in the oil circuit 27. For example, the cooling systems 1, the oil circuit 27, and the water circuit 30 are embodied as shown in FIGS. 1 and 3 (at least in excerpts thereof). Furthermore, a processor 44 is indicated here by means of which the necessary control and/or control of the shown (and possibly further) components can be implemented. The processor 44 is configured as a CPU, for example, and/or is part of an on-board computer of the motor vehicle 3.

With the cooling system described herein, a pressure equalization can be obtained from the environment without contamination of the coolant.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Cooling system
2 Traction machine
3 Motor vehicle
4 Circuit system
5 First coolant
6 First circulation pump
7 First circulation direction
8 Expansion tank
9 Gas
10 Motor input terminal
11 Motor output terminal
12 First heat exchanger

13 Environment
14 Volume equalization tank
15 Thermal management module
16 Chassis
17 Beam
18 Elastic wall
19 Rigid wall
20 First inlet
21 Second inlet
22 First outlet
23 Second outlet
24 Connection channel
25 Drive train
26 Transmission
27 Oil circuit
28 Second circulation direction
29 Second heat exchanger
30 Water circuit
31 Third circulation direction
32 Third heat exchanger
33 Pulse inverter
34 Drive wheel
35 Transport compartment
36 Reciprocating piston
37 Partition
38 Transmission component
39 Oil sump
40 Coarse filter
41 Second circulation pump
42 Oil filter
43 Differential
44 Processor

The invention claimed is:

1. A cooling system for an electric traction machine for a motor vehicle, comprising:
    a circuit system for conducting a first coolant to be circulated;
    a circulation pump for conveying the first coolant in the circuit system in a first circulation direction;
    an expansion tank filled at least partially with the first coolant to be circulated in the circuit system and at least partially with a gas;
    a motor input terminal for fluidically connecting the circuit system on an input side to the electric traction machine to be temperature-controlled;
    a motor output terminal for fluidically connecting the circuit system on an output side to the electric traction machine to be temperature-controlled; and
    a first heat exchanger for dissipating heat from and/or supplying heat to the first coolant to be recirculated in the circuit system,
    wherein the expansion tank is exclusively connected on a gas side to at least one volume equalization tank which is closed gas-tight to an environment.

2. The cooling system according to claim 1, wherein at least one of the volume equalization tanks is formed as:
    a portion of a thermal management module; and/or
    a part of a chassis of a motor vehicle.

3. The cooling system according to claim 2, wherein at least one of the volume equalization tanks is formed as a part of a chassis of a motor vehicle integrated into a beam of the chassis.

4. The cooling system according to claim 1, wherein at least one of the volume equalization tanks is formed as a container:
    having at least one elastic wall towards a surrounding environment; and/or having at least one rigid movable wall.

5. The cooling system according to claim 1, wherein the at least one volume equalization tank is loaded by atmospheric pressure from outside.

6. The cooling system according to claim 1, wherein the expansion tank comprises at least one of:
    at least one inlet for the first coolant;
    a first outlet for the first coolant;
    a second outlet for the gas; and/or
    a connecting channel between the at least one inlet and the outlets,
    wherein, in an installation situation, one of the at least one inlets for the first coolant and the second outlet for the gas is always arranged above the first outlet for the first coolant by a horizontal and/or vertical offset in each operating state.

7. A thermal management module for a powertrain of a motor vehicle, comprising:
    for a transmission, an oil circuit having a second circulation direction and having a second heat exchanger;
    for at least one vehicle component, a water circuit having a third circulation direction and having a third heat exchanger; and
    for an electric traction machine, the cooling system according to claim 1.

8. The thermal management module according to claim 7, wherein the water circuit with the first heat exchanger of the cooling system for the electric traction machine is connected to the environment for heat transfer, preferably as the sole fluid-bound heat transfer of the cooling system, wherein, preferably in the third circulation direction of the water circuit, a pulse inverter for an electric traction machine is arranged upstream of the first heat exchanger.

9. The thermal management module according to claim 8, wherein the water circuit with the first heat exchanger of the cooling system for the electric traction machine is connected to the environment for heat transfer as the sole fluid-bound heat transfer of the cooling system.

10. The thermal management module according to claim 8, wherein in the third circulation direction of the water circuit, a pulse inverter for an electric traction machine is arranged upstream of the first heat exchanger.

11. The thermal management module according to claim 7, wherein the water circuit is also connected with the second heat exchanger of the oil circulation for heat transfer.

12. The thermal management module according to claim 11, wherein the water circuit is also connected with the second heat exchanger of the oil circulation for heat transfer as the sole fluid-bound heat transfer of the cooling system to the environment.

13. The thermal management module according to claim 11, wherein, in the third circulation direction of the water circuit, the first heat exchanger is arranged ahead of the second heat exchanger.

14. The thermal management module according to claim 7, wherein a pulse inverter for the electric traction machine is arranged in the water circuit.

15. A powertrain for a motor vehicle, comprising:
    at least one electric traction machine for providing a torque;
    at least one propulsion wheel for propelling the motor vehicle by the torque of the electric traction machine;
    at least one transmission for conducting the torque between the electric traction machine and at least one of the propulsion wheels; and the thermal management module according to claim 7 for at least one of the electric traction machines, at least one of the transmissions, and at least one vehicle component.

16. The powertrain according to claim 15, comprising a pulse inverter for at least one of the electric traction machines.

17. A powertrain for a motor vehicle, comprising:

at least one electric traction machine for providing a torque;

at least one propulsion wheel for propelling the motor vehicle by the torque of the electric traction machine;

at least one transmission for conducting the torque between the electric traction machine and at least one of the propulsion wheels; and the cooling system according to claim 1 for the at least one electric traction machine, the at least one transmission, and at least one vehicle component.

18. A motor vehicle comprising:

a chassis having a transport compartment; and the powertrain according to claim 17 for driving the motor vehicle forward.

19. The powertrain according to claim 17, comprising a pulse inverter for at least one of the electric traction machines.

\* \* \* \* \*